9430X
S. COLT.
Revolving Gun.
4 Sheets—Sheet 1.
Patented Feb. 25, 1836.
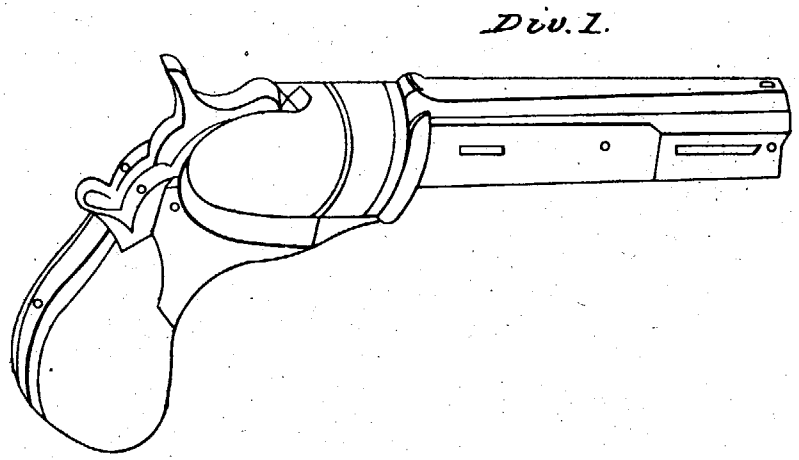

9430X
4 Sheets—Sheet 2.
S. COLT.
Revolving Gun.
Patented Feb. 25, 1836.
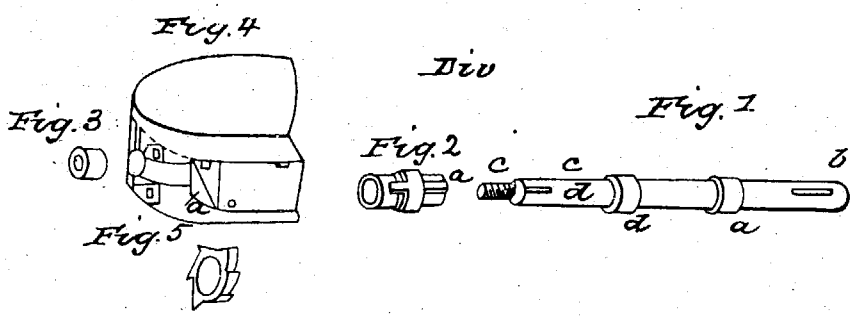

9430X
4 Sheets—Sheet 3.
S. COLT.
Revolving Gun.
Patented Feb. 25, 1836.
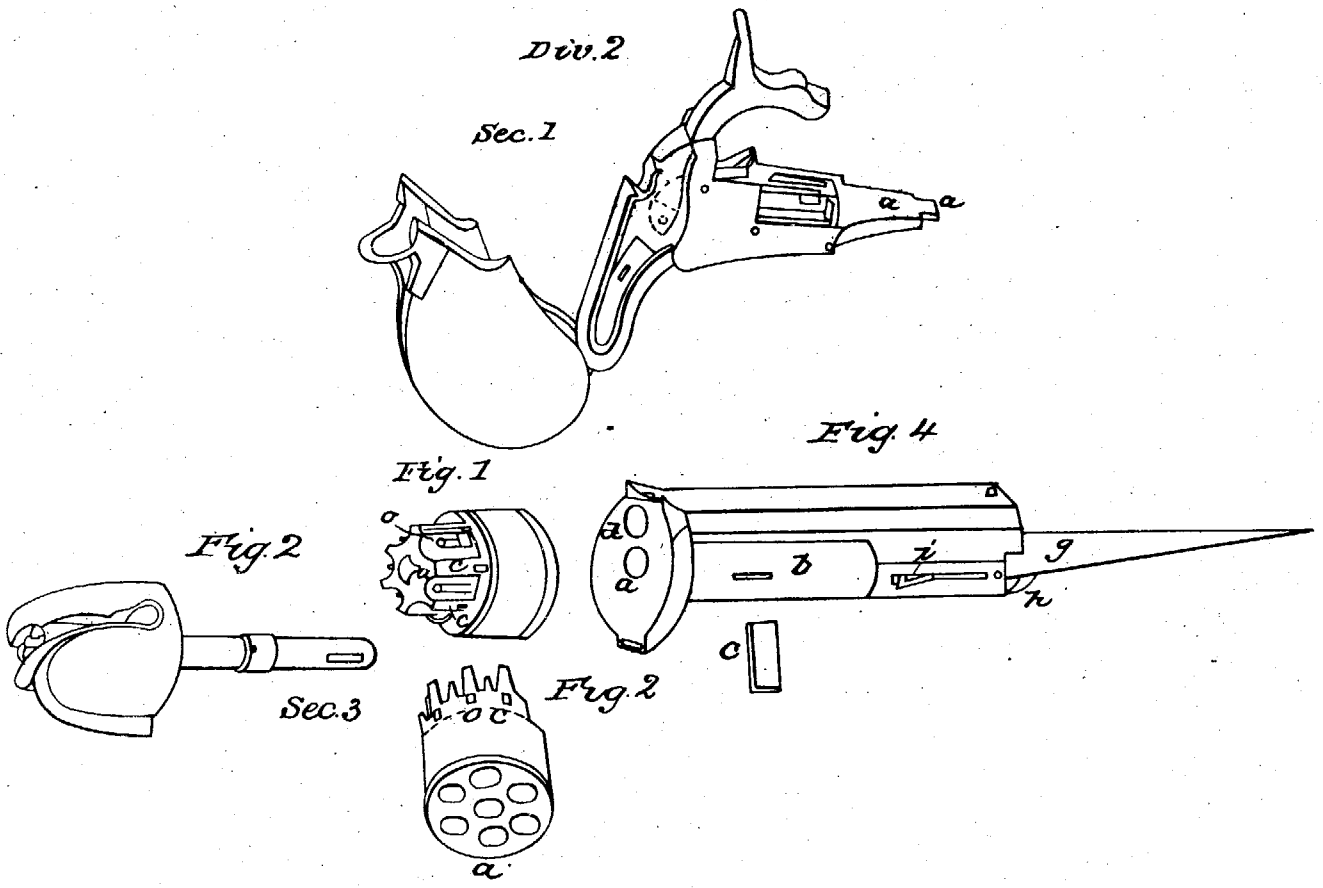

9430X
S. COLT.
Revolving Gun.
4 Sheets—Sheet 4.
Patented Feb. 25, 1836.
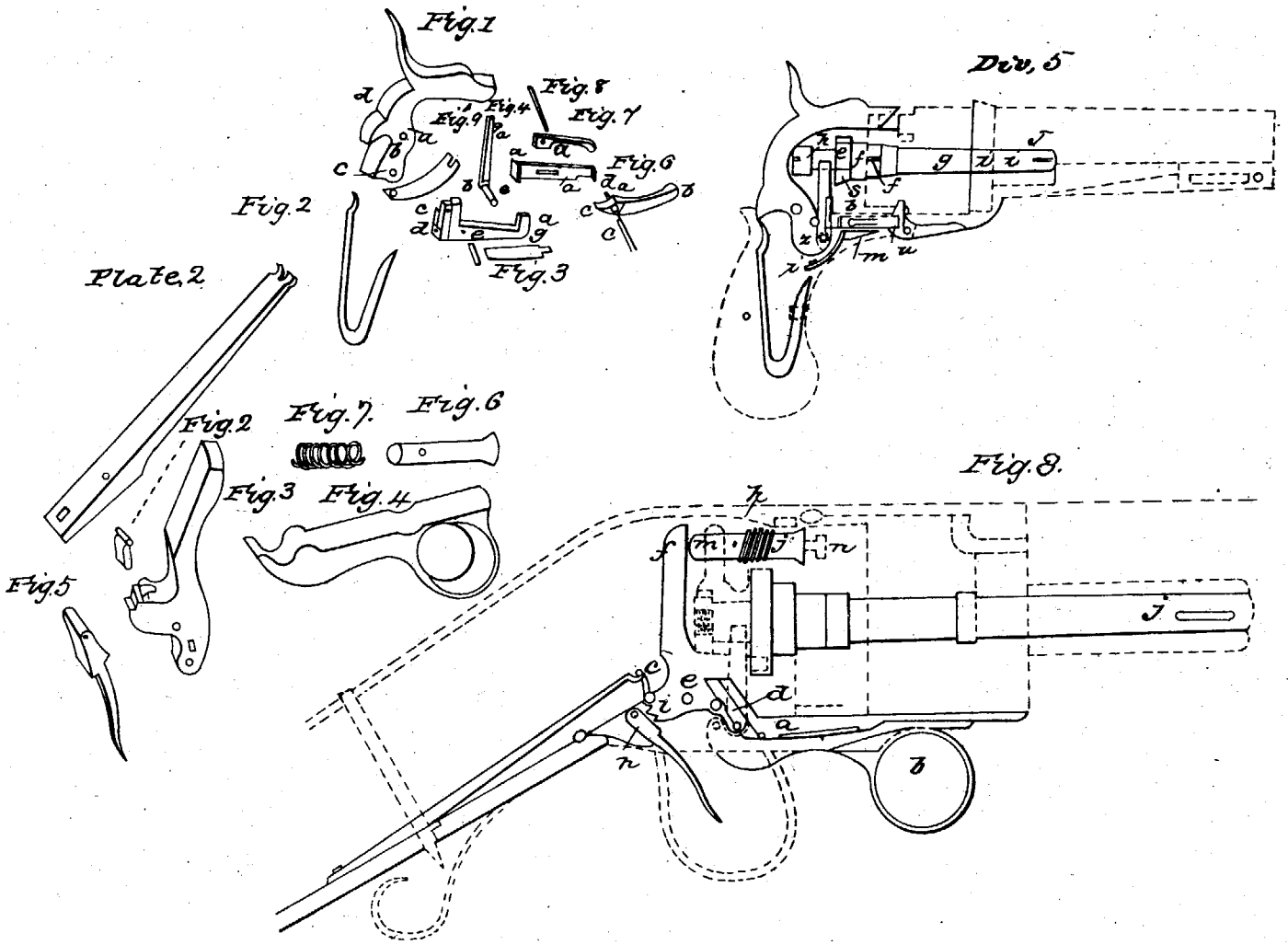

UNITED STATES PATENT OFFICE.

9430X

SAMUEL COLT, OF HARTFORD, CONNECTICUT.

IMPROVEMENT IN FIRE-ARMS.

Specification forming part of Letters Patent dated February 25, 1836.

*To all whom it may concern:*

Be it known that I, SAMUEL COLT, of Hartford, in the county of Hartford and State of Connecticut, have invented a new and useful Improvement in Fire-Arms; and I hereby declare that the following, with the accompanying drawings, is a full and exact description of the construction and operation of the said improvements as invented by me.

Division 1 of the drawings represents a pistol. Division 2 represents Division 1 in four sections, as 1, 2, 3, and 4. Division 3 represents all the parts in Section 1 of Division 2. Division 4 represents all the parts of Section 2 of Division 2. Division 5 represents the mechanical combination of the entire instrument.

Figure 1 of Division 3 represents the hammer which discharges the percussion-caps. It acts upon a fulcrum at *a*. *b* is a pin projecting from the hammer, which serves to operate the key that locks the cylinder when its respective chambers are brought directly opposite the barrel. C represents the hole which receives the lower arm of the lifter that turns the cylinder. *a* represents the part of the hammer where the mainspring acts upon it. *e* is a projection by which the hammer is drawn back.

Fig. 2 is the mainspring.

Fig. 3 is the key that holds the cylinder in its place by the arm *a* when each chamber is brought opposite the barrel. *b* is a spring, which is attached to the part *c*, which has a lateral motion to the right by means of a hinge at *d*, and serves to allow the pin *b* in Fig. 1 to pass it. The fulcrum of the key is at *e*. *f* is the fulcrum-pin. *g* is the spring which forces the key into the wards of the cylinder.

Fig. 4 is the lifter or hand, with a spring on the left side to allow it to move laterally to the left when acted on *a* by each tooth of the ratchet. At *b* is a joint, which connects it with the pin *c*, which acts in the hole *e* in Fig. 1.

Fig. 5 is the connecting-rod. The end *a* serves as a catch to the hammer when the lock is set, and when the hammer is pulled back the rod moves forward horizontally in consequence of the hammer's coming in contact with it, and the end *b* operates upon the trigger, Fig. 6, at the catch *a* and throws down the end *b*, by which means the claw *c* hooks into the end *b* of Fig. 5, and is held in its place by the spring, Fig. 7, acting upon it at the pin *d*.

Fig. 8 is the pin which holds in their places the spring, Fig. 7, at *a* and the connecting-rod, Fig. 5, at *c*. Fig. 6 moves on the pin *c* at *f*.

Fig. 9 is a spring, which holds the rod, Fig. 5, toward the hammer, that the connecting-rod may catch in a notch at the bottom of the hammer to hold it when set.

Division 4 is a dissection of Section 2.

Fig. 1 is the arbor on which the cylinder revolves. *a a'* are the bearings on which the cylinder rests. *b* is the slot through which a key enters to connect Section 4 with it. The part C passes through the shackle, Fig. 2, which is keyed to the cylinder, Section 3, Fig. 1, at the groove *a* by means of the tongue or projections A on the shackle. *e* is the part which receives the nut, Fig. 3, when it is connected with the shackle, Fig. 4, as seen at *a*, Section 2 in Division 2.

Fig. 5 is the ratchet, which is placed in the middle of the shield at *a*, and receives the shackle, to which it is connected by the tongue or projection *b*. The arbor is prevented from turning in the shield by means of a pin or key in the shield, which enters the groove *d* on the arbor.

Fig. 2, Section 3 of Division 2, represents the fore part of the cylinder. The holes *a a*, &c., represent the ends of the chambers for the charges. *b* is the hole through which the arbor (on which the cylinder revolves) passes. C C, &c., represent the wards to receive the end *a* of the key, Fig. 3, Division 3, to prevent the cylinder from turning when a charge is brought opposite the barrel.

*b b*, &c., Fig. 1, represent the tubes on which are placed the percussion-caps. C C, &c., are partitions which, when embraced in the shield, as in Division 1, prevent the communication of fire or smoke from one cap to the other.

In Division 2, Section 4, *a* represents the hole through which the arbor passes, and *b* a mortise for the key *c* to connect this section with the arbor. At *d* the ball enters the barrel from the chamber. At *e* the barrel is fastened to the plate. At *f* is a groove in the plate to receive the end *a* of the lock-plate of Section 1, which serves to steady it. *g* represents the bayonet hung on a pin at *h*, *i* being a catch to hold it in its place when it is thrown out. In Division 5 the hammer is hung at the fulcrum *a*. The key which holds the cylinder is hung at the fulcrum *b*. The lifter that works the ratchet has a working connection with the hammer on the left side at *c*. The arm *d* of the lifter works into the teeth of the ratchet on the left. *e* represents the ratchet when connected with the shackle. *f f* is the middle and forward part of the shackle on which the ratchet is placed. *g* is the arbor on which the cylinder revolves. The end *h* is the nut that holds the pin in its place when in the shield. *i i* represent the forward end of the arbor which passes through the plate and the projection on the lower part of the barrel, and by a key at *j* it is secured to the barrel. *k* represents the fulcrum of the trigger. *l* is the spring which forces the connecting-rod against the end of the hammer. *m* is the spring which forces the key that holds the cylinder. O is the mainspring. By drawing back the hammer the pin *p* operates upon the after end of the key (that locks the cylinder) and rises. Consequently the other end, *r*, is drawn from the cylinder, and the arm *d* of the lifter commences to act on a tooth, *s*, on the left side of the ratchet, which, being connected to the cylinder by means of the shackle, turns it until the next chamber is brought opposite to the barrel. When the pin *p* is relieved from the key by passing over its upper end, *t*, the pin allows the end *r* of the key to be forced by means of the spring *m* into the succeeding ward of the cylinder. At the same time, by the action of the lower end of the hammer *u* upon the connecting-rod at *v*, it produces a forward horizontal motion of the rod, when the end *w* is brought in contact with the upper projection of the trigger and forces it down to a proper position for the finger, when a claw at *x* of the trigger hooks into the connecting-rod, which holds the hammer when drawn back or set by means of the end *v* entering the lower catch, *y*, on the hammer. To discharge the pistol, by pulling the trigger the connecting-rod is drawn from the catch of the hammer, when the mainspring forces the hammer forward, the upper end of which strikes the percussion-cap, during which the lifter, by means of lateral motion to the left, falls below a succeeding tooth on the ratchet, when, by means of the lateral motion of the after end *q* of the key which holds the cylinder, the pin *p* of the hammer is permitted to fall below it again. By repetitions of the same motion of the hammer the same effect is produced until each succeeding chamber is discharged.

Plate 2 represents the principle of the invention as applicable to rifles, muskets, and other fire-arms, differing from what has already been described, first, in the manner of setting the lock; secondly, in the use of the adopter for communicating the force of the hammer to the percussion-cap; thirdly, in the situation of the mainspring and trigger; and, fourthly, in the construction of the lock-plate and guards that hold the stock.

Fig. 1 represents the mainspring. Fig. 2 is the stirrup to connect the mainspring with the hammer. Fig. 3 is the hammer. Fig. 4 is the lever for setting the lock. Fig. 5 is the discharging-trigger. Fig. 6 is the adopter. Fig. 7 is the spiral spring to draw back the adopter. Fig. 8 represents all the parts combined.

To set the lock, the fulcrum of the lever being at *a*, by drawing down on the end *b* the end *c* operates upon the end *d* of the hammer, whose fulcrum, being at *e*, throws back its end *f*, when the trigger at *g* (whose fulcrum is at *h*) operates upon the catches of the hammer at *i* to hold the lock when set. When the end *f* of the hammer is removed from the adopter (whose bearings are at *j j*) it is drawn back by means of the coiled spring *k* until its end *l* is drawn back sufficient to allow the cylinder to turn, which is effected as described in the pistol. After the finger is relieved from the lever (when the lock is set) a small spring draws it back to its former place to make room for the end *d* of the hammer, so that its force may not be impaired. By pulling the trigger from the catch of the hammer the mainspring (which is connected to the hammer by the stirrup *o*) forces its end *f* forward against the end *m* of the adopter, the end *l* of which is brought in contact with the percussion-cap placed upon the tube *n*, which discharges the load. To load, it is only requisite to draw the key *j*, which will liberate Section 4. Then by drawing the key that locks the cylinder (which may be effected by drawing back the hammer) the cylinder may be taken from the arbor.

Among the many advantages in the use of these guns, independent of the number of charges they contain, are, first, the facility in loading them; secondly, the outward security against dampness; thirdly, security of the lock against the smoke of the powder; fourthly, the use of the partitions between the caps, which prevent fire communicating from the exploding cap to the adjoining ones; fifthly, by the hammer's striking the cap at the end of the cylinder no jar is occasioned, deviating from the line of sight; sixthly, the weight and location of the cylinder, which give steadiness to the hand; seventhly, the great rapidity in the succession of discharges, which is effected merely by drawing back the hammer and pulling the trigger.

The advantages not applicable to the pistol are the use of the adopter and lever.

I claim as new—

1. The application of the caps at the end of the cylinder.
2. The application of a partition between the caps.
3. The application of a shield over the caps as a security against moisture and the action of the smoke upon the works of the lock.
4. The principle of the connecting-rod between the hammer and the trigger.
5. The application of the shackle to connect the cylinder with the ratchet.

6. The principle of locking and turning the cylinder.

7. The principle of uniting the barrel with the cylinder by means of the arbor running through the plate and the projection under the barrel.

8. The principle of the adopter and the application of the lever, neither of which is used in pistols.

SAMUEL COLT.

Witnesses:
ROBERT CLARKE,
WM. WALLIS.